Jan. 29, 1935.   R. S. DRUMMOND   1,989,650
METHOD OF LAPPING GEARS
Original Filed June 29, 1931   2 Sheets-Sheet 1
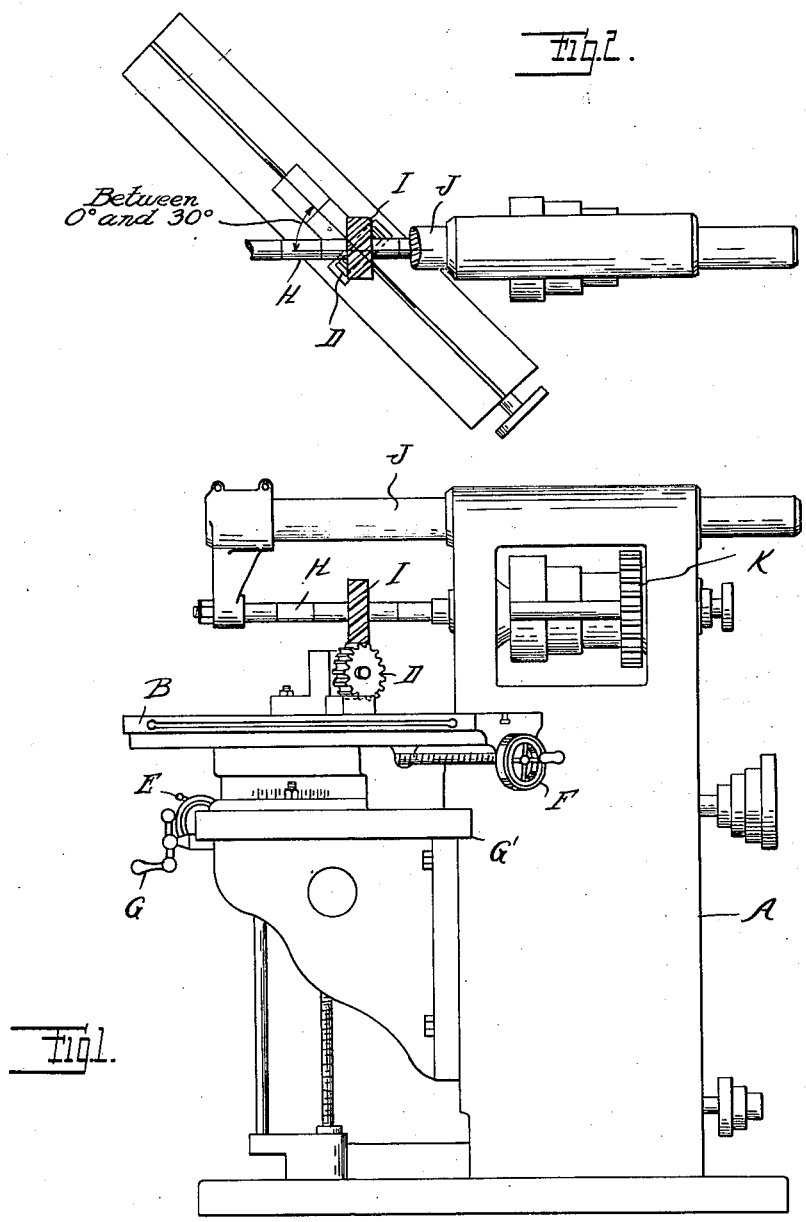

Jan. 29, 1935. R. S. DRUMMOND 1,989,650
METHOD OF LAPPING GEARS
Original Filed June 29, 1931 2 Sheets-Sheet 2
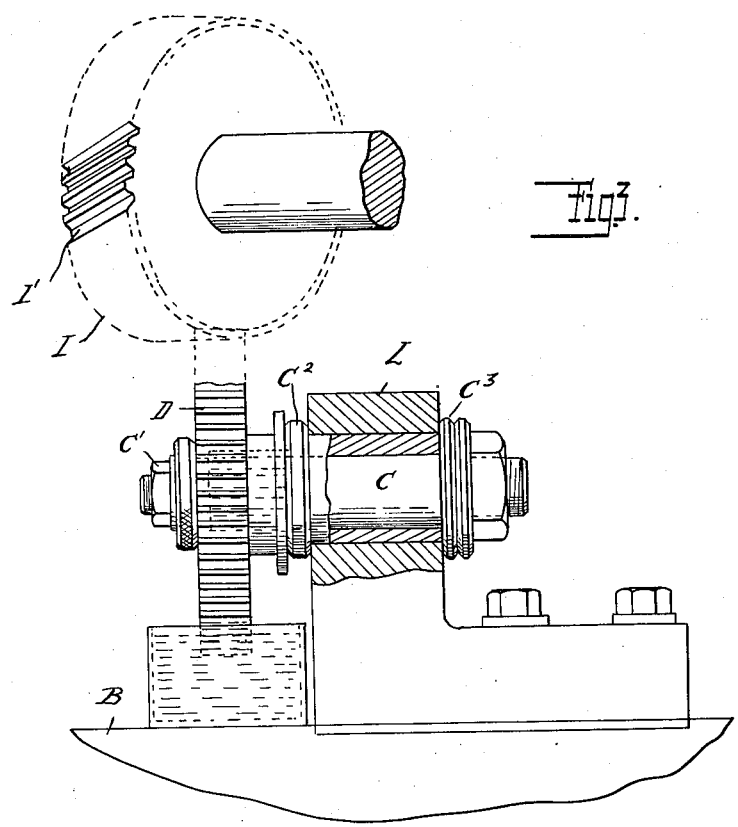
INVENTOR
Robert S. Drummond
BY
ATTORNEYS Patented Jan. 29, 1935

1,989,650

UNITED STATES PATENT OFFICE 1,989,650

METHOD OF LAPPING GEARS

Robert S. Drummond, Detroit, Mich.

Application June 29, 1931, Serial No. 547,704
Renewed July 16, 1934

4 Claims. (Cl. 51—278)

The invention relates to the lapping of gears and has for its principal object the elimination of certain errors which are sometimes developed as an incident to the lapping process. More specifically, the invention relates to the lapping of gears by running the same in mesh with a lap, the axis of which is non-parallel to the axis of the gear and is not in a common plane therewith. This results in a sliding movement of the gear teeth over the teeth of the lap whch is transverse both to the lines of simultaneous contact and also transverse to the plane of rotation. As a consequence, the abrading action will be substantially uniform on all high spots regardless of their location in the surface of the gear teeth. The lap employed in this method, which may be made of soft metal such as cast iron, is originally cut with its involute teeth of the proper helical angle and of a contour corresponding to a base circle of predetermined radius. The tooth thickness, however, is somewhat in excess of the tooth thickness which would be proper for a mating gear. Consequently the lap is provided with sufficient stock in its teeth to compensate for wear and by feeding it inward towards the gear being lapped it may be used until the tooth thickness is reduced to a predetermined limit.

With the method as above described it has been found that the lapped gears are sometimes noisy even where they are found to be correct in circular pitch and in tooth contour. The reason for this was not at first appreciated but I have discovered that it is due to an error in helical angle of the lapped gear which does not exactly correspond to that of the mating gear. The reason for this error is that as the lap wears, the cross sectional contour of the tooth form is preserved, but as the lap is slightly reduced in diameter and correspondingly in circumferential length, this will slightly alter the helical angle. In other words, the lead of one end of the tooth in advance of the other end will remain constant and if the circumferential length is decreased this will alter the helical angle.

Based on this discovery I have modified the method of lapping so as to compensate for any radial wear in the lap by a corresponding change in the angle of the axis of the lap with respect to the axis of the gear. If such compensation is made, the lap may be used with satisfactory results through its entire life.

Another important feature of my invention is in the angular arrangement of the axes of rotation of the gear and lap. I have found that the best results are obtained when the axes are crossed at an angle between 3° and 30°.

My improved method may be carried out with different types of apparatus and may be either manually or automatically controlled. I shall, however, describe only a simple apparatus in which the control is manual.

In the drawings:

Figure 1 is a side elevation of a machine with which my method may be performed;

Figure 2 is a plan view thereof;

Figure 3 is a sectional elevation showing the lap and the relative arrangement of the same with respect to the gear to be finished.

As shown in detail in Figure 1, A is any suitable machine such as a universal milling machine of ordinary construction which is provided with a work table B for supporting a work arbor C on which the gear D to be finished may be mounted. The table is raised or lowered by suitable mechanism (not shown) controlled by the handle E and the table B is moved longitudinally or parallel to the arbor C through the operation of a handle F. There is also an adjustment operated by the handle G for moving the table inward or outward on the bed G'.

Above the table B is the arbor H having the lap I mounted thereon, said arbor being journaled in bearings upon the adjustable slide J relatively movable in a direction parallel to the axis of the arbor. The arbor H is driven by any suitable means such as the gearing K.

As shown in detail in Figure 3, the gear D to be lapped is detachably mounted upon the arbor C having a splined or other driving engagement therewith and a clamping nut C' retains the work in position. Axial movement of the arbor is prevented by end thrust bearings $C^2$ and $C^3$ on opposite ends of the bearing L. The lap I may be of any desired dimensions but the teeth I' thereof are so cut as to be conjugate to the teeth of the gear to be finished and also to be of a predetermined helical angle. The helical pitch is, of course, the same as that of the gear to be lapped but the tooth thickness of the lap is greater than that proper for a mating gear of the lapped gear. In the original setting of the machine the lap is mounted upon the arbor H while the gear D to be lapped is mounted upon the arbor C. The table B is then manually adjusted angularly and is accurately set to bring the axis of the arbor H in exactly predetermined relation to the axis of the arbor C. This relation is such that the teeth of the lap will be exactly parallel with the teeth of the gear when the latter are at the exact predetermined helical angle to the axis of the gear. The table is then vertically adjusted so as to place a predetermined contact pressure between the teeth of the lap and the gear. Abrasive material is then spread upon the surface of the lap and rotary motion is imparted to the machine to cause the gear and lap to run in mesh. This will cause the abrading of the high points on the teeth of the gear but will also wear the lap so that it is necessary from time to time to further raise the table to renew the desired pressure contact. This in fact is a very essential part of the process, for I have found that where the gear and lap are permitted to run in mesh without sufficient contact pressure there will be a washing action by the abrasive which will destroy the accuracy of the tooth formed.

As has been previously described, wear in the lap will cause a change in the helical angle of the teeth. This is compensated for by a corresponding angular adjustment of the table which may be determined either by the amount of upward feed of the table since its original setting or by testing the gear lapped for correctness of helical angle and then altering the angular setting of the table to correct any error. It is also possible to make an automatic compensation through which the feeding of the axis of the lap towards the axis of the gear will produce a corresponding angular feeding of the table. However, the specific mechanism for accomplishing this is not illustrated and therefore will not be further described.

Certain features of the invention described and illustrated but not claimed herein are claimed in my co-pending applications relating to method for finishing gears, Serial No. 604,575, filed April 11, 1932 and Serial No. 626,769, filed July 30, 1932.

What I claim as my invention is:

1. The method of finishing gears which consists in forming a lapping tool having teeth conjugate to the gear to be lapped and of such a helical angle that the axis of the lap will be non-parallel to and have no common plane with the axis of the gear when in mesh therewith, relatively adjusting the axes of said gear and lap to an exactly predetermined angular relation such that the teeth of the lap will be exactly parallel to the teeth of the true gear and will be in pressure contact therewith, running the gear and lap in mesh and simultaneously reciprocating one axially in relation to the other, relatively adjusting the axes of said gear and lap to compensate for wear in the latter and to maintain pressure contact between the teeth thereof and also relatively adjusting the same angularly to compensate for wear in the lap so as to maintain the parallelism of the teeth thereof with the teeth of the true gear.

2. The method of finishing gears which consists in running the gear to be finished in mesh with a lapping tool having conjugate teeth of such angle to its axis that the latter will be non parallel to and in no common plane with the axis of the gear, relatively adjusting the axes of said gear and lap to an exactly predetermined angular relation such that the teeth of the lap will be exactly parallel to the teeth of the gear when the latter are in the exactly predetermined relation to the axis thereof, and adjusting this angular relation between the axes of the gear and lap to compensate for any wear in the latter so as to maintain a constant angular relation between the teeth of the lap and the axis of the gear being lapped.

3. The method of finishing gears which consists in running the gear to be finished in mesh with a lapping tool having conjugate teeth of such an angle to its axis that the latter will be non-parallel to and in no common plane with the axis of the gear, initially adjusting the axes of said gear and lap to an exactly predetermined angular difference, adjusting said axes towards each other to produce a cramping action between the teeth of the gear and the lap and in subsequently changing the angular relation of the axis of said gear and lap to compensate for wear in the latter and to maintain a correct helical angle in the gear.

4. The method of finishing gears which consists in running the gear to be finished in mesh with a finishing tool having conjugate teeth of such an angle to its axis that the latter will be non-parallel to, at an angle less than 30° and in no common plane with the axis of the gear, initially adjusting the axes of said gear and finishing tool to an exactly predetermined angular difference, adjusting said axes towards each other to produce a cramping action between the teeth of the gear and the finishing tool and in subsequently changing the angular relation of the axis of said gear and finishing tool to compensate for wear in the latter and to maintain a correct helical angle in the gear.

ROBERT S. DRUMMOND.